No. 770,015. PATENTED SEPT. 13, 1904.
F. N. MERRILL.
CONVEYER ROLLERS.
APPLICATION FILED OCT. 23, 1903.
NO MODEL.
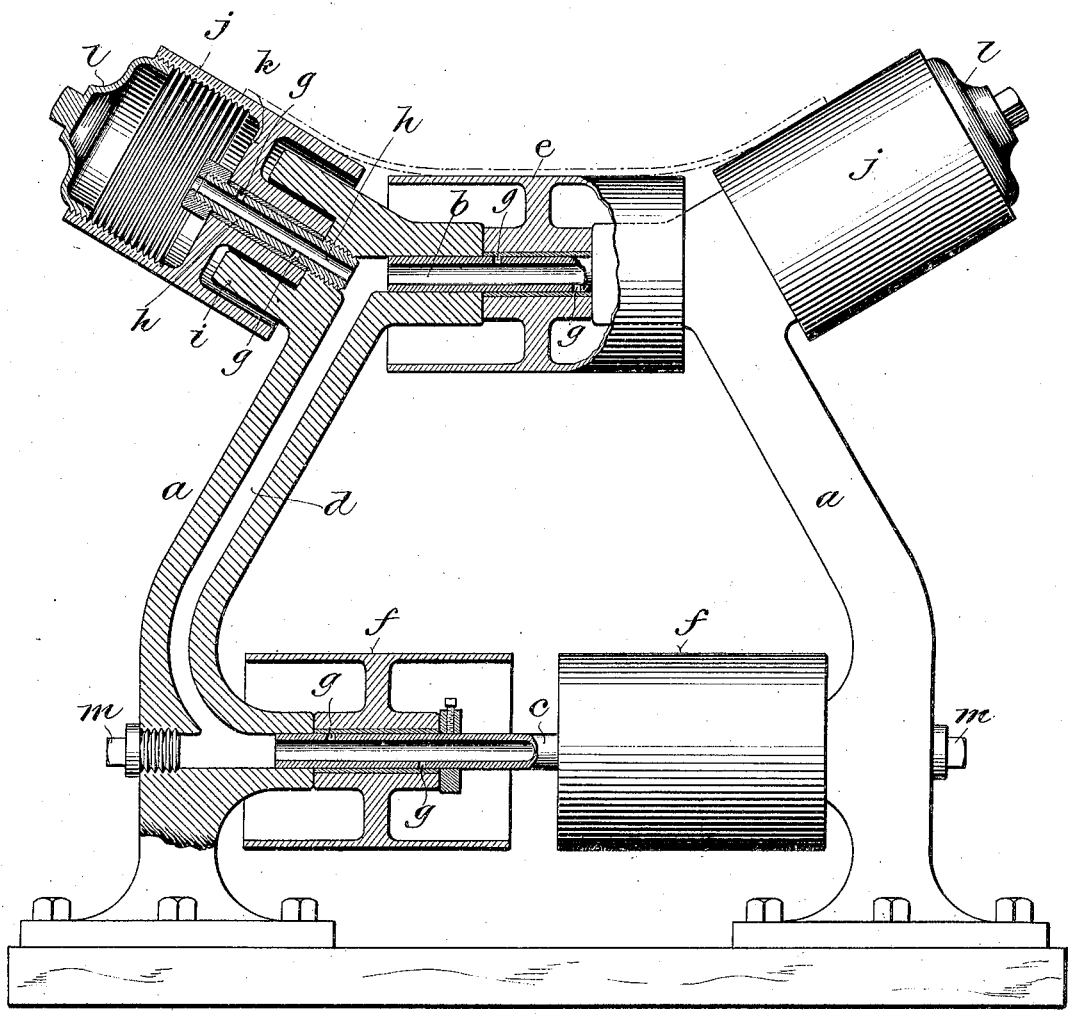
Witnesses:
Geo. W. Young.
Chas. L. Goss.
Inventor:
Frank N. Merrill
By Winkley Flanders Smith Bottum & Vilas,
Attorneys.

No. 770,015. Patented September 13, 1904.

UNITED STATES PATENT OFFICE.

FRANK N. MERRILL, OF BELGIUM, WISCONSIN.

CONVEYER-ROLLERS.

SPECIFICATION forming part of Letters Patent No. 770,015, dated September 13, 1904.

Application filed October 23, 1903. Serial No. 178,224. (No model.)

*To all whom it may concern:*

Be it known that I, FRANK N. MERRILL, a citizen of the United States, residing at Belgium, in the county of Ozaukee and State of Wisconsin, have invented certain new and useful Improvements in Conveyer-Rollers, of which the following is a specification, reference being had to the accompanying drawing, forming a part thereof.

This invention relates particularly to supporting and guiding rollers for belt conveyers which are commonly employed to transfer from one point to another sand, gravel, crushed stone, and other gritty substances. Its main objects are to provide for thorough and constant lubrication of such rollers, to exclude sand, grit, or dirt from their bearings, and generally to simplify and improve the construction and operation of devices for this purpose.

It consists in certain novel features of construction and in the peculiar arrangement and combinations of parts, as hereinafter particularly described, and defined in the claims.

The accompanying drawing shows a roller frame or stand and rollers embodying my invention, partly in side elevation and partly in vertical medial section.

The stand or frame is composed of two sections or uprights $a\ a$, which are connected at or near their upper and lower ends by horizontal tubular journals $b$ and $c$ and are formed with passages $d$, which communicate with and connect the bores of said journals. A guide and supporting roller $e$ is mounted on the upper journal $b$, and one or more similar rollers $f$ are mounted on the lower journal $c$ between the uprights $a$. The journals $b$ and $c$ are formed with lateral openings $g$ to deliver lubricant from the bores of said journals to the bearing-faces within the hubs of the rollers. To the upper part of the stand or frame are secured at their lower ends in line with the upper horizontal journal $b$ upwardly-inclined tubular journals $h$, and around these journals on the uprights $a$ are formed annular flanges $i$, concentric with said journals, which latter are also formed with lateral openings $g$.

$j\ j$ are rollers having closed webs $k$ between their ends and on one side of said webs hubs which are fitted to turn on the journals $h$ within the flanges $i$, the rims of said rollers at their inner lower ends extending over said flanges. The webs $k$ form, with the rims of said rollers at their outer and upper ends, lubricant-receptacles which communicate with the bores of the journals $h$ at their upper and outer ends and are provided with caps or closures $l$, which are preferably threaded inside of the rims of the rollers and serve with stiff lubricants as adjustable followers to compress the lubricant and force it as required into and through the hollow journals and the passages in the stand to the bearing-faces to be lubricated. The caps or closures $l$ are formed with wrench-heads or means for screwing them into and out of said rollers.

The uprights $a$ of the stand or frame are provided with passages or openings in line with the bore of the lower journal $c$, and these openings are provided with screw-threaded plugs or closures $m$ to afford access to the bore of said journal for the purpose of removing obstructions therefrom in case it becomes clogged. Access is had to the bore of the upper journal $b$ through the journals $h$ by simply removing the caps or closures $l$. The rollers $e$ and $j$ are arranged, as shown, to give a trough-like shape to the upper part of the conveyer-belt, as indicated by dotted lines on the drawing, the rollers $f$ being arranged to support and guide the lower or return part of the belt.

It will be observed that with my improved construction and arrangement of parts the rollers $j$ will hold a sufficient quantity of lubricant to supply their bearings and the bearings of the other rollers associated therewith for a long time and that the lubricant will be fed to the several bearings as required through the hollow journals and the lateral openings therein and through the passages in the roller stand or frame without attention other than to occasionally screw the caps or followers $l$ down in case a semisolid or thick lubricant is used. It will also be observed that all the bearing-surfaces on which the rollers turn are protected against grit or dirt, which would otherwise work into them and cause them to run hard and wear rapidly. By utilizing the rollers themselves or some of them for holding the lubricant, oil, or grease cups or other external connections for this purpose, which project more or less, are in the way and are liable to be knocked off or injured, are dispensed with.

Various changes in minor details of construction and arrangement of parts may be made within the spirit and intended scope of the invention without affecting the principle and operation of the device.

I claim—

1. The combination of a stand having a tubular journal which is open at one end and has a lateral opening or passage through it, a roller having a closed web and a hub fitted to turn on said journal, said web forming with the rim of the roller a lubricant-receptacle which communicates with one end of the bore of said journal, and a removable cap or closure for said receptacle, substantially as described.

2. The combination of a stand having a tubular journal with a lateral opening and an annular flange surrounding said journal, a roller having a closed web and a hub fitted upon said journal and into said flange, said web forming with the rim of the roller a lubricant-receptacle which communicates with the bore of said journal through one end thereof, and a removable cap or closure for said receptacle, substantially as described.

3. The combination of a stationary tubular journal having a lateral opening through it, a roller having a closed web between the ends of its rim and on one side of said web a hub which is fitted to turn on said journal, said web forming with the overhanging rim of the roller on one side thereof a lubricant-receptacle which communicates with the bore of said journal, and an adjustable cap or closure for said receptacle, substantially as described.

4. The combination of a stand having a tubular journal with a lateral opening through it and an annular flange concentric with and surrounding one end of the journal, a hollow roller having a closed web between its ends and a hub on one side of said web fitted to turn on said journal and within said flange, the rim of the roller projecting at one end over said flange and at the other end forming with said web a lubricant-receptacle which communicates with the bore of said journal at its free end, and a removable cap or closure for said receptacle, substantially as described.

5. The combination of a stand composed of uprights connected by horizontal tubular journals and having passages communicating with and connecting the bores of said journals, rollers fitted to turn on said journals, upwardly-inclined tubular journals attached to said uprights in communication with the passages therein, rollers having hubs fitted to turn on said inclined journals and formed with lubricant-receptacles communicating with the bores of said journals and removable caps or closures for said receptacles, substantially as described.

6. The combination of a stand composed of uprights connected by horizontal tubular journals and having passages connecting the bores of said journals and upwardly-inclined tubular journals attached at their lower ends to said uprights in line with the bore of the upper horizontal journal, rollers mounted on the horizontal journals which have lateral openings through them, rollers formed in their outer ends with lubricant-receptacles and fitted to turn on said inclined journals which communicate at their outer ends with said receptacles and have lateral openings from their bores into the hubs of said rollers, and removable caps or closures for said lubricant-receptacles, the passages in said uprights having openings in line with the bore of the lower horizontal journal and plugs or closures for said openings, substantially as described.

7. The combination of a tubular journal having a lateral opening and a roller fitted to turn on said journal and having an internal lubricant-receptacle which is adapted to communicate with the bore of said journal and a removable cap or closure adjustable in said receptacle to force the lubricant therefrom into said tubular journal, substantially as described.

In witness whereof I hereto affix my signature in presence of two witnesses.

FRANK N. MERRILL.

Witnesses:
CHAS. L. GOSS,
ELINOR V. WRIGHT.